(12) United States Patent  (10) Patent No.: US 8,589,219 B2
Bogdan  (45) Date of Patent: Nov. 19, 2013

(54) METHODS, SYSTEMS, AND COMPUTER PROGRAM PRODUCTS FOR MOBILE NETWORK SUBSCRIBER INCENTIVE PROGRAMS

(75) Inventor: Pamela A. M. Bogdan, Neptune, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 866 days.

(21) Appl. No.: 12/553,774

(22) Filed: Sep. 3, 2009

(65) Prior Publication Data

US 2011/0054990 A1  Mar. 3, 2011

(51) Int. Cl.
*G06Q 30/00* (2012.01)
(52) U.S. Cl.
USPC .......................................... 705/14.1
(58) Field of Classification Search
USPC .......................................... 705/14
See application file for complete search history.

(56) References Cited

U.S. PATENT DOCUMENTS

2006/0135120 A1   6/2006  Likourezos
2011/0060635 A1*  3/2011  Pollard et al. .............. 705/14.17
2011/0265109 A1* 10/2011  Goyet et al. ...................... 725/9

OTHER PUBLICATIONS

Eden, Terence, "Donate Minutes Via your Mobile", Topsy.com, May 25, 2009, pp. 1-5.*
"Champions of the Environment 2006", AT&T Corp. Environment, Health & Safety Organization, retrieved from http://www.corp.att.com/ehs/champions/champs2006/index2006.html, 4 pages.

* cited by examiner

*Primary Examiner* — Alvin L Brown
(74) *Attorney, Agent, or Firm* — Parks IP Law LLC; Jennifer P. Medlin, Esq.

(57)  ABSTRACT

A number of reward programs can be offered to subscribers of a mobile network as an incentive to use fewer allocated resources, rather than more. For example, in some embodiments, a subscriber may elect to participate in a reward program wherein a portion of the unused resources are used to determine a monetary amount to be returned to the subscriber at, for example, the end of a year. In some embodiments, a subscriber may elect to participate in a reward program wherein a portion of the unused resources (such as unused minutes under their plan) are used to offset the costs of "green programs", which may be implemented by the operator of the network. In other words, the subscribers can be encouraged to use fewer resources by allowing a portion of those unused resources (in the form of, for example, cash) to offset the cost of a program, which the subscriber believes provides some benefit. The reward programs offered may recognize any societal issue.

20 Claims, 7 Drawing Sheets

FIGURE 1

Service Plan:

1000 minutes
100 text messages
1 GB data transfers

Usage

500 Minutes
50 Text Messages
500 MB data transfers

Subscriber Reward Program

Percentage = .01, amount = $0.50

Charitable Reward Program

Percentage = .02, amount = $1.00

Societal Issue Reward Program

Percentage = .03, amount = $1.50

METHODS, SYSTEMS, AND COMPUTER PROGRAM PRODUCTS FOR MOBILE NETWORK SUBSCRIBER INCENTIVE PROGRAMS

FIELD OF THE INVENTION

The present invention generally relates to the field of electronic communications.

BACKGROUND

It is known to provide incentive programs to consumers to encourage desired behavior. For example, U.S. patent application No. 2006/0135120 entitled, "Method And System For Awarding Points to a Mobile Device Subscriber Based on Usage Time While At A Premature location discusses how subscribers can be awarded frequent flier mileage points and/or other types of points based on cell phone usage times and/or mobile device usage time while at a particular predetermined location, such as on board a particular commercial carrier.

It is also known to solicit the donation of unused cell phones to charitable organizations so that those unused phones may be recycled and utilized by other who may need cell phone service. One such organization is known as Cell Phones for Soldiers, which is available on the Internet at URL: cellphonesforsoldiers.com.

SUMMARY

A number of reward programs can be offered to subscribers of a mobile network as an incentive to use fewer allocated resources, rather than more. For example, in some embodiments, a subscriber may elect to participate in a reward program wherein a portion of the unused resources are used to determine a monetary amount to be returned to the subscriber at, for example, the end of a year. In some embodiments, a subscriber may elect to participate in a reward program wherein a portion of the unused resources (such as unused minutes under their plan) are used to offset the costs of "green programs", which may be implemented by the operator of the network. In other words, the subscribers can be encouraged to use fewer resources by allowing a portion of those unused resources (in the form of, for example, cash) to offset the cost of a program, which the subscriber believes provides some benefit. The reward programs offered may recognize any societal issue.

This description, be within the scope of the present invention, and be protected by the accompanying claims.

DESCRIPTION OF THE EMBODIMENTS

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention is described below with reference to diagrams (such as block diagrams and flowcharts) and/or operational illustrations of methods, systems and computer program products according to some embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The present invention may be embodied in hardware and/or in software (including firmware, resident software, microcode, etc.) including a combination of both. For example, servers according to some embodiments of the invention may be implemented as a processor circuit that operates according to software executed by the processor circuit. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the block and/or flowchart block or blocks.

The computer code may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

Embodiments can operate in a logically separated client side/server side-computing environment, sometimes referred to hereinafter as a client/server environment. The client/server environment is a computational architecture that involves a client process (i.e., a client) requesting feature from a server process (i.e., a server).

As described hereinbelow in greater detail, a number of reward programs can be offered to subscribers of a mobile network as an incentive to use fewer allocated resources, rather than more. For example, in some embodiments, a subscriber may elect to participate in a reward program wherein a portion of the unused resources (such as unused minutes under their plan) are used to offset the costs of "green programs", which may be implemented by the operator of the network. In other words, the subscribers can be encouraged to use fewer resources by allowing a portion of those unused resources (in the form of, for example, cash) to offset the cost of a program, which the subscriber believes provides some benefit. The reward programs offered can recognize any societal issue.

In still further embodiments, the reward program can be a charitable reward program wherein the determined amount of the subscriber's unused resources is used to offset the cost incurred by the provider in providing volunteers to the charitable organization. Further, the subscriber may be motivated to use fewer mobile network resources by being offered the incentive to support a charitable effort.

In still further embodiments, the reward program can be a subscriber reward program wherein an amount associated with the unused portion of the allocated resources can be returned to the subscriber in the form of cash credited to their account.

Figure 1:
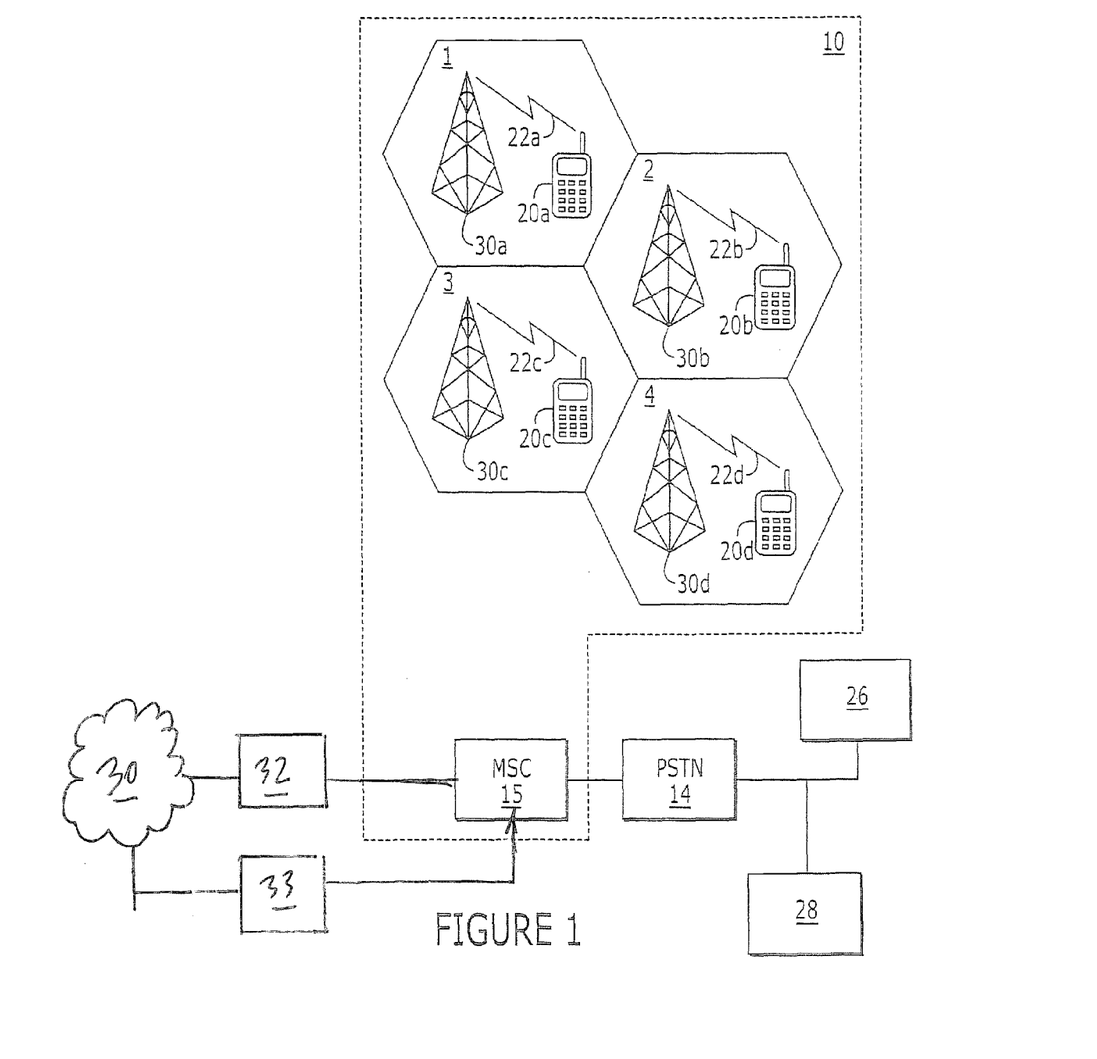
FIG. 1 is a schematic illustration of a mobile communication network serving subscribers having elected reward programs for participation according to embodiments.

FIG. 1 is a diagram that illustrates a mobile cellular network 10 (referred to herein sometimes as the "network") that supports communications in which mobile terminals 20a-d can be used. A network 10 is commonly employed to provide voice, text, and data communications services to the mobile terminals 20.

As used herein, a "mobile terminal" includes devices having receive and transmit hardware capable of two-way communication over a two-way communication link such as those described herein in reference to the network 10. Such mobile terminals may include cellular telephone or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space.

The mobile terminals 20a-d can communicate with each other and other terminals, such as terminals 26, 28, via the network 10 and a Public Service Telephone Network (PSTN) 14. The mobile cellular telephone network 10 is organized as cells 1-4 that collectively can provide service to a geographic region. In particular, each of the cells can provide service to associated sub-regions included in the geographic region covered by the network 10. More or fewer cells can be included in the network 10, and the coverage area for the cells 1-4 may overlap. Each of the cells 1-4 may include an associated base station 30a-d. The base stations 30a-d can provide wireless communications between each other and the mobile terminals 20a-d in the associated geographic region to allow for communications between the mobile terminals 20a-d and/or the terminals 26, 28 in the PSTN 14 via a Mobile Switching Center (MSC) 15.

Each of the base stations 30a-d can transmit/receive data to/from the mobile terminals 20a-d over an associated control channel 22a-d. For example, the base station 30a in cell 1 can communicate with the mobile terminal 20a over the control channel 22a. The control channel 22a can be used to page the mobile terminal 20a in response to calls directed thereto or to transmit traffic channel assignments to the mobile terminal 20a over which a call associated therewith is to be conducted. The control channels 22a-d can be identified using control channel numbers or identifiers. For example, the mobile terminal 20a can store a channel number that identifies control channel 22a as the control channel on which it is currently camping.

The network 10 also can be used to transmit/receive text messages. The mobile terminals can send/receive text messages, such as those commonly referred to as Short Message Service (SMS) or Enhanced Message Service (EMS) formatted messages, Multimedia Message Service (MMS), and/or Smartmessaging™ formatted messages. Other types of messages may be used.

As is known to those skilled in the art, SMS and EMS messages can be transmitted/received on digital networks, such as GSM networks, allowing relatively small text messages (for example, 160 characters in size) to be sent and received via the network operator's message center to the mobile terminal 20, or from the Internet, using a so-called SMS (or EMS) "gateway." For example, SMS has been implemented as a point-to-point service where an SMS message can be transmitted from one mobile terminal to another via a short message service center (SMSC), which can act as a store and forward system for the SMS messages. As used herein, the term "message" includes SMS type messages as well as any other type of message that can be used in the type of mobile cellular network described herein, such as MMS.

The network 10 also can be used to provide the mobile terminals 20 with access to the Internet 30 via a gateway 32. The gateway 32 can allow access to, for example, pages served up by web servers, which can be viewed on screens of the mobile terminals 20.

An incentive program system 33 is coupled to the MSC 15 and/or to the Internet so that the subscriber may access an associated account to elect one or more incentive programs for participation. The system 33 can also be configured to operate the incentive programs by, for example, determining amounts to be provided the subscriber elected programs based on the subscriber's usage and the predetermined parameters of the particular incentive programs, as described herein.

Figure 2:
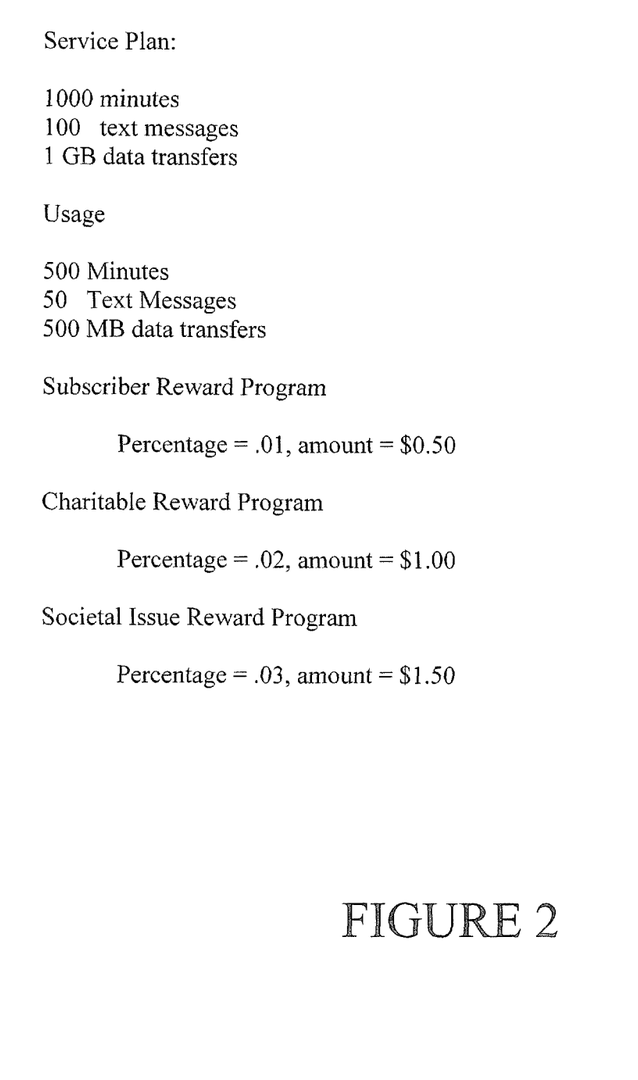
FIG. 2 is a table showing an exemplary embodiment of an account associated with a subscriber having elected to participate in a plurality of reward programs including amounts calculated thereunder according to embodiments.

FIG. 2 is a table which illustrates exemplary embodiments of the determination of amounts provided to reward programs elected by a subscriber. According to FIG. 2, the exemplary service plan associated with the subscriber provides mobile network resources as follows: 1,000 minutes of talk time, 100 text messages, and 1 GB of data transfer. The subscriber's account is charged $100.00 per month under the service plan.

As further shown in FIG. 2, the subscriber's usage of the mobile network resources described above totals 500 minutes of talk time, 50 text messages, and 500 MB of data transfers. In other words, under the exemplary embodiment shown in FIG. 2, the subscriber utilizes only half of the mobile network resources allocated to the subscriber under the plan. Accordingly, a subscriber reward program elected by the subscriber can provide 1% of the unused portion of the mobile network resources multiplied by the rate plan (i.e., $100 per month). As illustrated in FIG. 2, the subscriber may be awarded with a 50 cent credit toward their outstanding balance due under their plan based on the underutilization of the mobile network resources allocated to the subscriber. In other embodiments, the subscriber may be awarded with a check, for example, annually which totals the entire amounts accumulated under the subscriber reward program.

As further illustrated in FIG. 2, if the subscriber elects to participate in a charitable reward program where the subscriber's utilization of mobile network resourcing is as described above, the percentage under the charitable reward program can be 2% multiplied by the unused portion of the mobile network resources multiplied by the plan, to provide a credit of $1.00 to help offset the costs incurred by the service provider by allowing employees to volunteer for charitable work during work hours.

As further illustrated in FIG. 2, if the subscriber elects to participate in a societal issue reward program (such as a program designed to offset the costs of replacing relatively low efficiency equipment with relatively higher efficiency equipment) the percentage thereunder can be 3% which is multiplied by the unused portion of the mobile network resources multiplied by the plan to provide a credit of $1.50 to help offset the costs of implementing the program. According, as illustrated in FIG. 2, the subscriber can be provided with an incentive to use fewer resources by appealing to the subscribers concerns regarding, for example, charity and societal issues.

In some embodiments, a program office can be provided to manage which reward programs are approved for election by the subscriber. For example, the program office can determine which societal issue reward programs are actually approved for election by the subscriber to insure that the programs are in-keeping with management objectives. In some embodiments, an auditor office can be provided to audit the costs associated with the reward programs, and to insure that the amounts generated by the subscribers' election of the program is actually allocated to offset the costs incurred by the service provider by allowing employees to volunteer for charitable work during work hours, in the case of a charitable reward program. In some embodiments, the auditor office can insure that the amounts generated by the subscribers' election of the program is actually allocated to offset the costs incurred in, for example, replacing relatively low efficiency equipment with relatively higher efficiency equipment, in the case of a societal issue reward program.

Figure 3:
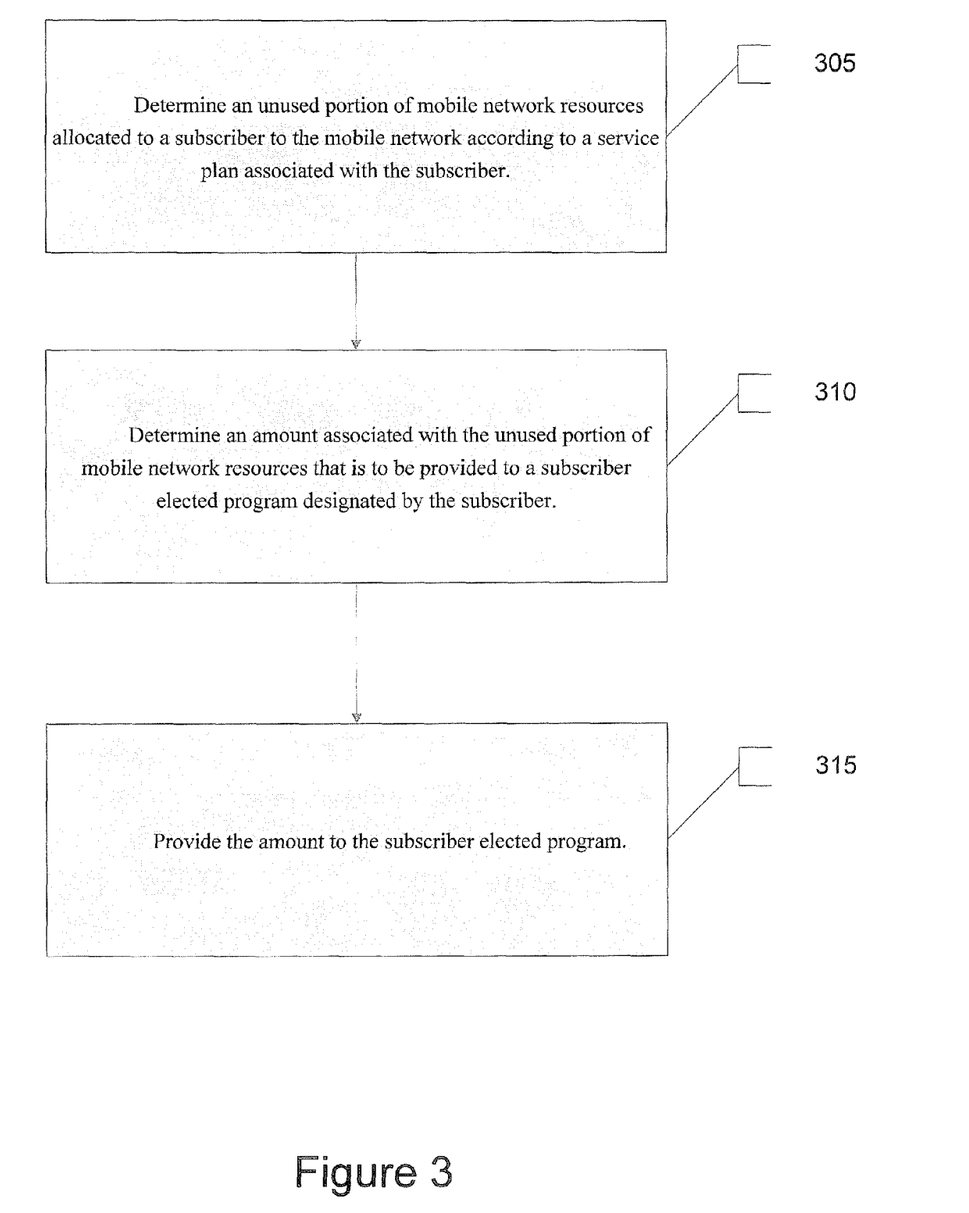
FIGS. 3-6 are flow charts which illustrate operations of systems configured to administer subscriber elected reward programs in some embodiments.

FIG. 3 is a flow chart that illustrates operations of systems used to administer subscriber elected programs as part of an incentive system in some embodiments. According to FIG. 3, an unused portion of the mobile network resources for a subscriber of the network is determined in comparison to the total resources allocated to the subscriber under the subscriber service plan (Block 305).

Next, an amount is determined that is associated with the unused portion of the mobile network resources. In some embodiments, the amount is determined to be equivalent to some monetary amount. The amount is to be provided to a subscriber' elected reward program designated by the subscriber (Block 310). It will be understood that the subscriber can elect which programs he/she would like to participate in when the service plan is initiated in or at anytime subsequent to initiation of the service plan, such as when new programs are introduced by the service provider. Furthermore, it will be understood that the subscriber can elect more than one of reward programs in which to participate in some embodiments.

Referring to FIG. 3, the determined amount is provided to the subscriber elected program (Block 315). In some embodiments, the mobile network resources on which the amount is determined can be an unused number of minutes, an unused number of text messages, or an unused amount of data transfers, each of which the subscriber is entitled to use under the subscriber's service plan. Other types of resources can also be used.

Figure 4:
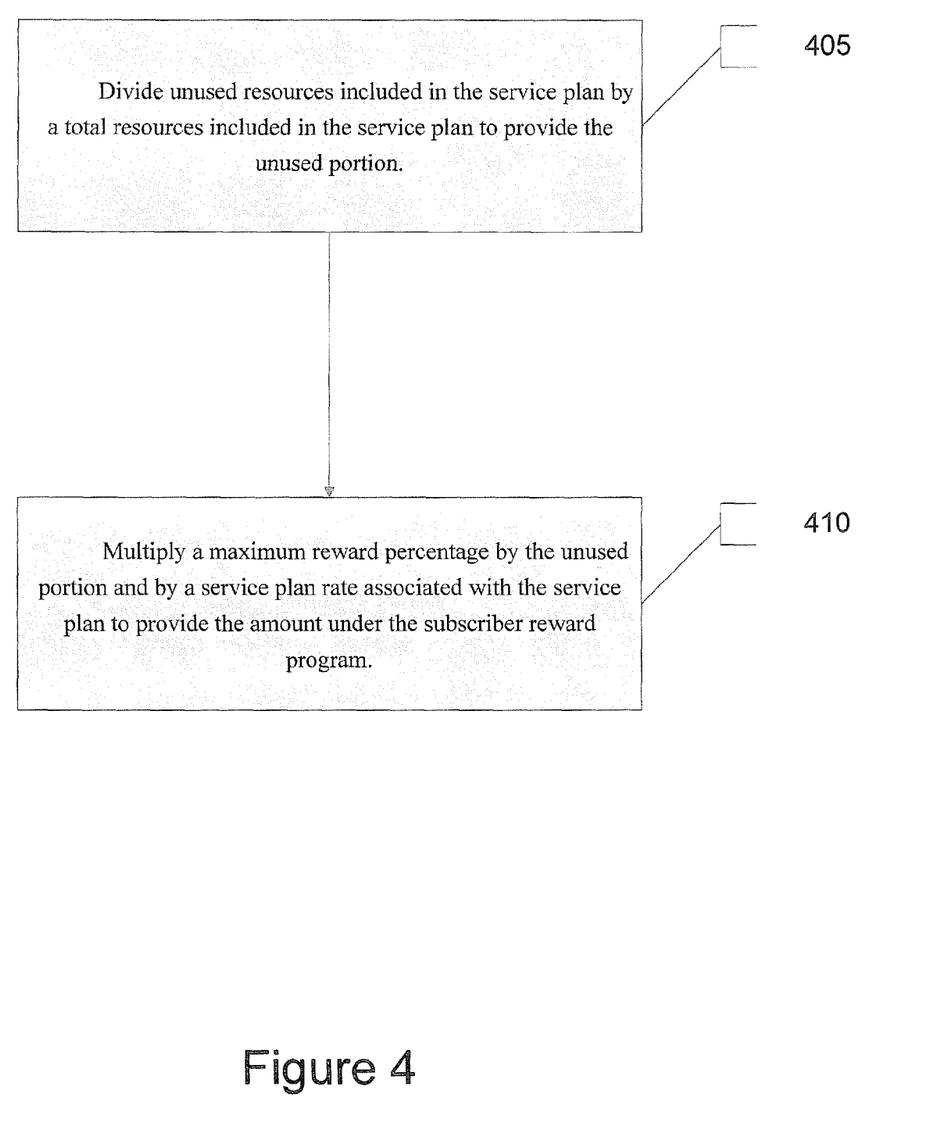

FIG. 4 is a flowchart which illustrates operations of systems used to administer subscriber reward programs described herein in some embodiments wherein the subscriber can be provided with a monetary credit, such as in the form of a check, based on unused resources. According to FIG. 4, the unused resources allocated under the service plan are divided by a total number of resources including the service plan to provide an unused portion of the mobile network resources (Block 405). In some embodiments, the unused resources can be determined by subtracting the used resources from the total allocated resources under the service plan. Other techniques can be used to determine the unused resources.

Next, the unused portion of the mobile network resources is multiplied by a maximum reward percentage, and also multiplied by the service rate plan (i.e., such as $100.00 per a month) to determine the amount that is provided to the subscriber elected program (Block 410).

Figure 5:
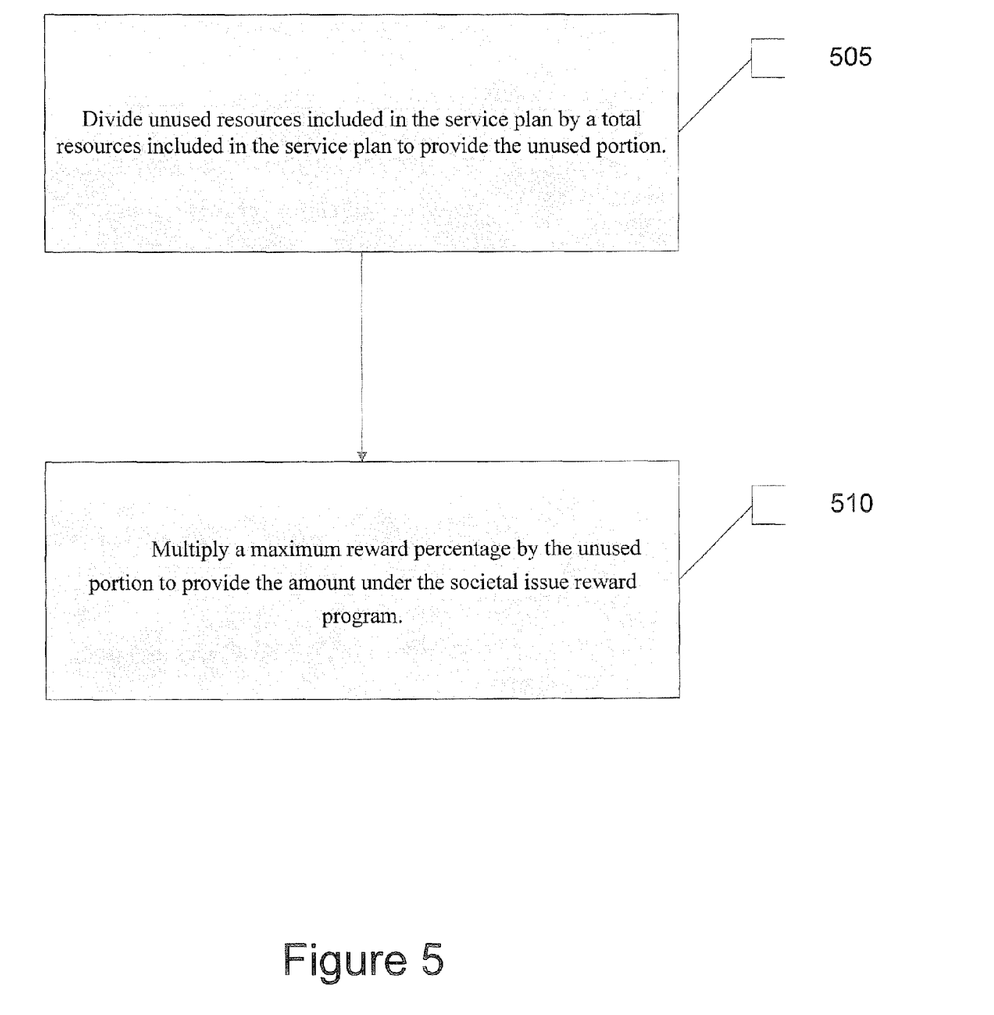

FIG. 5 is a flow chart that illustrates operations of systems used to administer a societal issue reward program in some embodiments. According to FIG. 5, the unused resources under the service plan is divided by a total number of resources allocated to the subscriber under the service plan to provide the unused portion (Block 505). Other techniques can be used to determine the unused resources. Next, the unused portion is multiplied by a maximum societal issue percentage to provide the amount with the societal issue reward program (Block 510).

Figure 6:
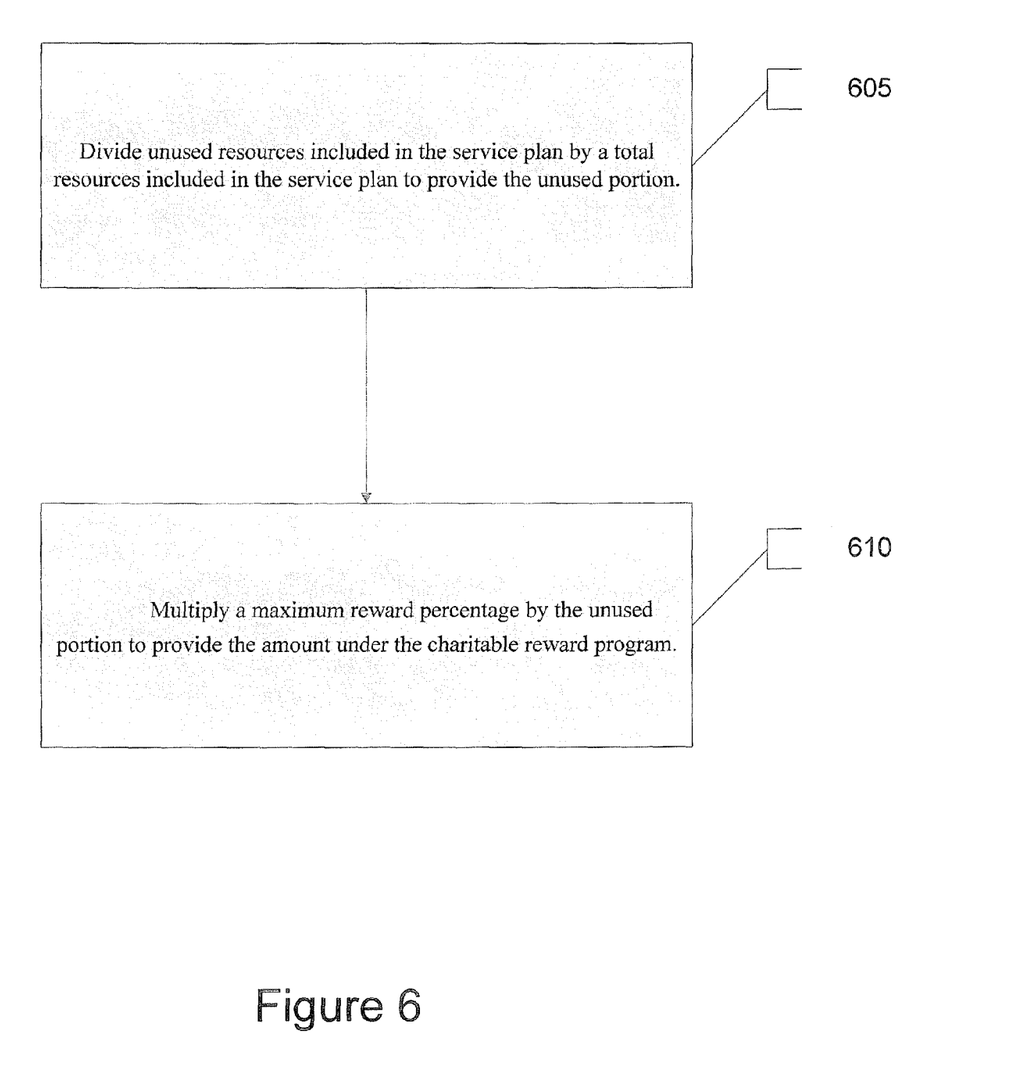

FIG. 6 is a flow chart that illustrates operations of systems configured to administer a charitable reward program in some embodiments. According to FIG. 6, the unused resources included in the service plan is divided by a total number of resources allocated to the subscriber under the service plan to provide the unused portion (Block 605). Next, the unused portion is multiplied by a maximum charitable reward percentage to provide the amount to be divided to the charitable reward program (Block 610).

Figure 7:
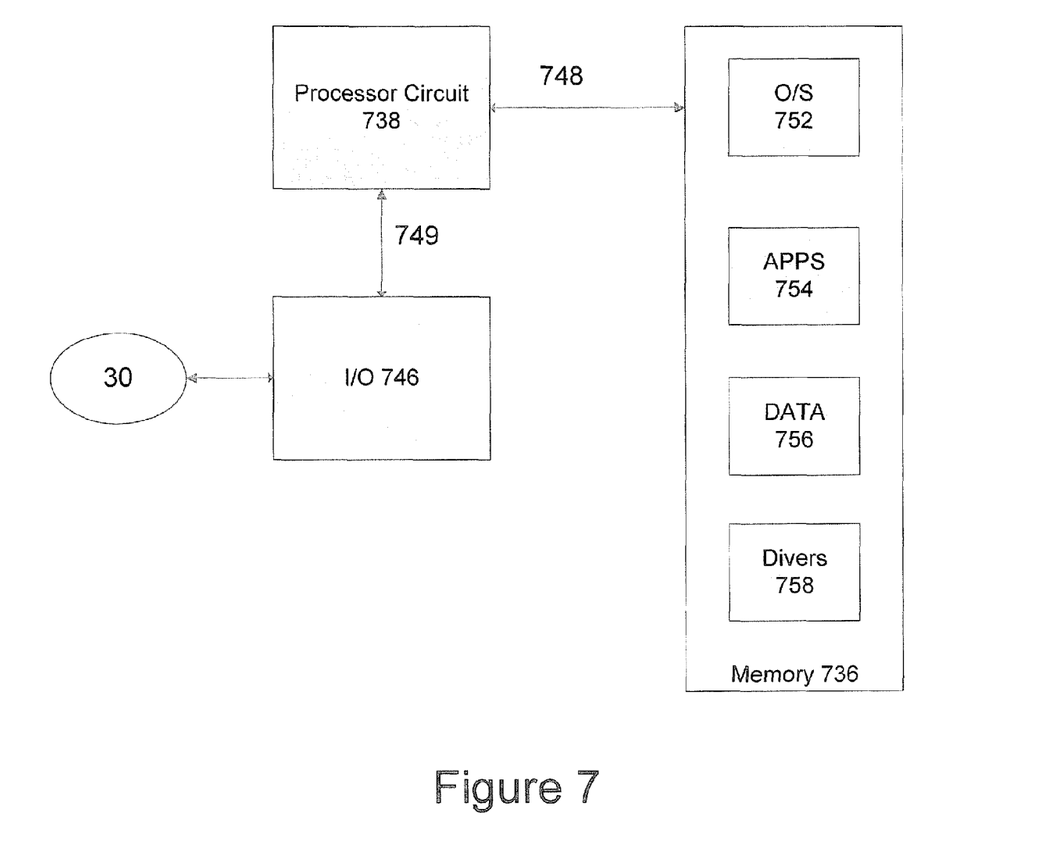
FIG. 7 is a block diagram which illustrates processor circuits configured to operate systems for reward programs in some embodiments.

FIG. 7 is a block diagram that illustrates systems configured to carry out operations described above according to some embodiments. As illustrated, the incentive system server includes a processor circuit 738, a memory 736 and input/output (I/O) circuits 746. The incentive system server may be incorporated in, for example, a general purpose computer, server, or the like. The processor circuit 738 communicates with the memory 736 via an address/data bus 748 and communicates with the input/output circuits 746 via an address/data bus 749.

The incentive system server can be accessed by a subscriber via the Internet 30 through the input/output circuits 746 using, for example, an Internet Protocol (IP) connection. The subscriber can use the system to elect which reward programs to participate in. The system can also be configured to administer the reward programs to determine the amounts to be credited to the reward programs based on the parameters determined, for example, in reference to FIGS. 2-6 herein.

The components in the incentive system server may be known components such as those used in many data processing systems, which may be configured to operate as described herein. In particular, the processor circuit 738 can be any commercially available or custom microprocessor, microcontroller, digital signal processor or the like. The memory 736 may include any memory devices containing the software and data used to implement the functionality circuits or modules used in accordance with embodiments of the present invention. The memory 736 can include, but is not limited to, the following types of devices: cache, ROM, PROM, EPROM, EEPROM, flash memory, SRAM, DRAM and magnetic disk.

As further illustrated in FIG. 7, the memory 736 may include several categories of software to provide operation of the incentive system server: an operating system 752; application programs 754 including the software to provide the operations of the reward programs described herein, input/output device drivers 758; and data 756.

The data 756 represents the static and dynamic data used by the application programs 754, the operating system 752, and the input/output device drivers 758, that may reside in the memory 736. The data 756 can include the maximum award percentages described herein.

As will be appreciated by those of skill in the art, the operating system 752 may be any operating system suitable for use with a data processing system, such as OS/2, AIX or zOS from International Business Machines Corporation, Armonk, N.Y., Windows 95, Windows98, Windows2000, WindowsXP, Vista from Microsoft Corporation, Redmond, Wash., Unix or Linux.

The input/output device drivers 758 typically include software routines accessed through the operating system 752 by the application programs 754 to communicate with devices such as the input/output circuits 746 and the memory 736.

As described herein, a number of reward programs can be offered to subscribers of a mobile network as an incentive to use fewer allocated resources, rather than more. For example, in some embodiments, a subscriber may elect to participate in a reward program wherein a portion of the unused resources (such as unused minutes under their plan) are used to offset the costs of "green programs", which may be implemented by the operator of the network. In other words, the subscribers can be encouraged to use fewer resources by allowing a portion of those unused resources (in the form of, for example, cash) to offset the cost of a program, which the subscriber believes provides some benefit. The reward programs offered can recognize any societal issue.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method comprising:
   determining, by a system using a computer processor, in connection with an incentive program associated with a mobile network, an unused portion of mobile network resources allocated, based on parameters of a service plan, to a subscriber to the mobile network, wherein the mobile network resources comprise messages for transmission and/or reception by the subscriber, and wherein the service plan is associated with the subscriber;
   determining, by the system, a value associated with the unused portion of the mobile network resources comprising the messages for transmission and/or reception by the subscriber, wherein the value is selected to be provided to a subscriber elected program designated by the subscriber; and
   providing, by the system, the value to the subscriber elected program.

2. A method according to claim 1, wherein the subscriber elected program comprises a subscriber reward program, and wherein the method further comprises crediting an account associated with the subscriber with the value, wherein the value comprises a monetary credit to the subscriber.

3. A method according to claim 2, wherein determining the value associated with the unused portion of the mobile network resources comprises:
   dividing the unused portion of resources allocated to the subscriber by an amount of total resources allocated to the subscriber to yield the unused portion; and
   multiplying a maximum reward percentage by the unused portion and by a service plan rate associated with the service plan to yield the value.

4. A method according to claim 3, wherein the value comprises a monetary credit to the account associated with the subscriber.

5. A method according to claim 1, wherein the subscriber elected program comprises a charitable reward program, and wherein the method further comprises crediting an account associated with a provider of the mobile network with the value.

6. A method according to claim 1, wherein determining the value associated with the unused portion of the mobile network resources comprises:
   dividing unused resources allocated to the subscriber by an amount of total resources allocated to the subscriber to yield the unused portion; and
   multiplying a maximum reward percentage by the unused portion to yield the value.

7. A method according to claim 6, wherein the value comprises a monetary credit to offset costs associated with services provided to a charitable organization on behalf of a provider of the mobile network.

8. A method according to claim 1, wherein the subscriber elected program comprises a societal issue reward program, and wherein the method further comprises crediting an account associated with a provider of the mobile network with the value.

9. A method according to claim 8, wherein determining the value associated with the unused portion of the mobile network resources comprises:
dividing unused resources allocated to the subscriber by an amount of total resources allocated to the subscriber to yield the unused portion; and
multiplying a maximum societal issue reward percentage by the unused portion and by a service plan rate associated with the service plan to yield the value.

10. A method according to claim 9, wherein the value comprises a monetary credit to offset costs of implementing systems associated with a promotion of a societal issue incurred by the provider of the mobile network.

11. A method according to claim 1, wherein the mobile network resources further comprise time allocated for calls by the subscriber.

12. A method according to claim 1, wherein the mobile network resources further comprise data units for transmission and/or reception by the subscriber.

13. A system comprising:
a processor; and
a memory in communication with the processor, the memory having stored therein computer-executable instructions that, when executed by the processor, cause the processor to perform operations comprising:
determining, in connection with an incentive program associated with a mobile network, an unused portion of mobile network resources allocated, based on parameters of a service plan, to a subscriber to a mobile communications network, wherein the mobile network resources comprise messages for transmission and/or reception by the subscriber, and wherein the service plan is associated with the subscriber;
determining a value associated with the unused portion of the mobile network resources comprising the messages for transmission and/or reception by the subscriber, wherein the value is selected to be provided to a subscriber elected program designated by the subscriber; and
providing, by a device driver, the value to the subscriber elected program.

14. A system according to claim 13, wherein the subscriber elected program comprises a subscriber reward program, and wherein the computer-executable instructions, when executed by the processor, cause the processor to perform operations further comprising crediting an account associated with the subscriber with the value, wherein the value comprises a monetary credit to the subscriber.

15. A system according to claim 14, wherein when determining the value associated with the unused portion of the mobile network resources, the computer-executable instructions, when executed by the processor, further cause the processor to perform operations comprising:
dividing unused resources allocated to the subscriber by an amount of total resources allocated to the subscriber to yield the unused portion; and
multiplying a maximum reward percentage by the unused portion and by a service plan rate associated with the service plan to yield the value.

16. A method according to claim 15, wherein the value comprises a monetary credit to the account associated with the subscriber.

17. A system according to claim 13, wherein the subscriber elected program comprises a charitable reward program, and wherein the computer-executable instructions, when executed by the processor, further cause the processor to perform operations comprising crediting an account associated with a provider of the mobile network with the value.

18. A system according to claim 13, wherein when determining the value associated with the unused portion of the mobile network resources, the computer-executable instructions, when executed by the processor, further causes the processor to perform operations comprising:
dividing unused resources allocated to the subscriber by an amount of total resources allocated to the subscriber to yield the unused portion; and
multiplying a maximum reward percentage by the unused portion to yield the value.

19. A system according to claim 18, wherein the value comprises a monetary credit to offset costs associated with services provided to a charitable organization on behalf of a provider of the mobile network.

20. A non-transitory computer-readable storage device comprising computer-executable instructions that, when executed by a processor, cause the processor to perform operations comprising:
determining, in connection with an incentive program associated with a mobile network, an unused portion of mobile network resources allocated, based on parameters of a service plan, to a subscriber to a mobile communications network, wherein the mobile network resources comprise messages for transmission and/or reception by the subscriber, and wherein the service plan is associated with the subscriber;
determining a value associated with the unused portion of the mobile network resources comprising the messages for transmission and/or reception by the subscriber, wherein the value is selected to be provided to a subscriber elected program designated by the subscriber; and
providing, by a device driver, the value to the subscriber elected program.

* * * * *